April 25, 1961      W. M. JACKSON      2,981,556
WELDING STRESS-FREE OUTLET FITTING
Filed May 16, 1957
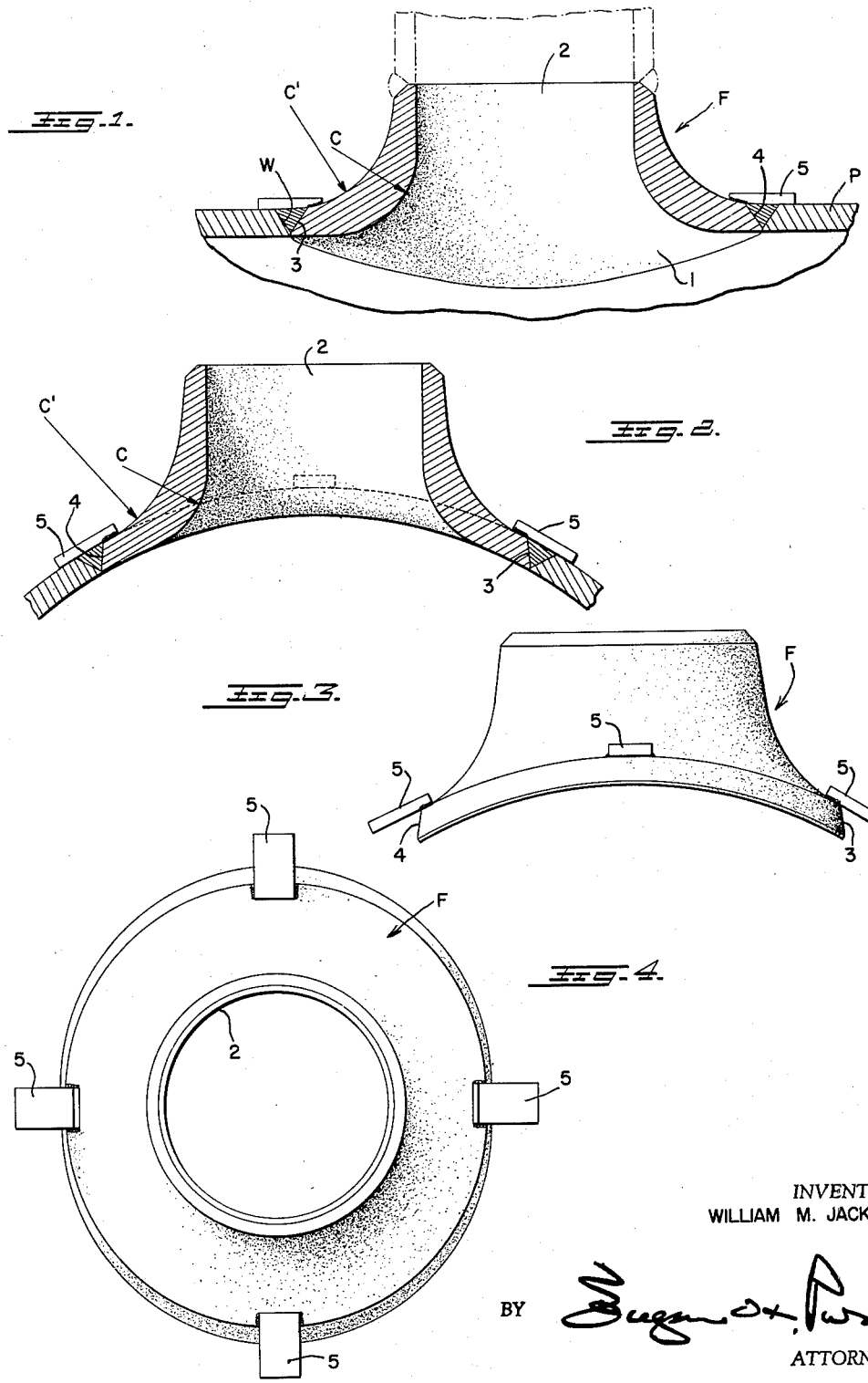
INVENTOR
WILLIAM M. JACKSON
ATTORNEY

2,981,556
WELDING STRESS-FREE OUTLET FITTING

William M. Jackson, Allentown, Pa., assignor to Bonney Forge & Tool Works, Allentown, Pa., a corporation of Pennsylvania Filed May 16, 1957, Ser. No. 659,710

2 Claims. (Cl. 285—22)

This invention relates to welded outlet fittings for metal conduits, pipes, cylindrical vessels and the like.

The provision of outlet openings in the walls of metal conduits, such for example as those used for oil and gas transmission lines, presents a serious problem not only because of the higher pressures for fluid transmission now permissible under many state and federal codes, but also because of the manufacture of such conduits for less ductile metals than was formerly the practice. The formation of an opening in the wall of a conduit and the attachment thereto of an outlet fitting creates stress concentrations in the vicinity of the outlet.

The reinforcement of a welded outlet connection is commonly attempted by a lap-type joint surrounding the opening which aims to reduce the stress concentrations at the outlet. Because such lap-type reinforcement abruptly changes the wall thickness where it adjoins the pipe, additional stress concentrations as a result are introduced. When the conduit is composed of relatively ductile metal as is used in the oil, chemical and power industries, this is not a fatal objection because such local stress concentrations tend to relieve themselves sufficiently for the connection to remain serviceable under normal working conditions; however, in the case of conduits composed of less ductile metals these stress concentrations conduce to metal fatigue and may eventually result in the failure of the welded connection. This fault becomes further aggravated in gas and oil transmission piping as the relatively higher allowable operating limit approaches the limit of ultimate strength. The problem of stress concentration around a branch connection is critical in nature and has been tolerable up to the present time only because of the allowance of a sufficiently high factor of safety, which safety factor has now been lowered in the above industries, thus exposing the vulnerability of branch connections to failure.

The foregoing will become more apparent from a consideration of the following principles of mechanics. When an object is subjected to an external force, the transmitted effects of that force may either be the same or may differ widely at various locations throughout the object, the principal factors which determine the magnitude of the stresses being the dimensions of the object, its shape, the homogeneity of the fiber or crystalline structure of the material comprising the object, and its surface smoothness. Stress is the load per unit area, whether this area be a square inch or the cross-section of a minute particle or fiber of the material of which the object is made, and the amount of the applied force, and the dimensions and shape of the object determine the stress.

Assuming the cross-sectional shape of the object to be regular and the force applied to be uniform, the fiber stress can be assumed to be equal throughout the object. However, if the shape is irregular, the fiber stress will vary depending upon its location in the object. It will generally be greater at the area of smaller cross-section than at the areas of larger cross-section. Likewise, the point or line marking a directional change in the shape of the object may be considered the fulcrum of a bending force when the article is subjected to pressure. When an abrupt change in thickness and of direction (curvature or angularity) occurs at or adjacent the same locality in the object, the stress concentration effect is superimposed one upon the other. Such stress may exceed many times over the stresses simultaneously produced in other portions of the object by the same externally acting force.

Because a welded outlet fitting by its nature involves a change of direction with respect to the conduit to which it is attached in order to divert the flow from the conduit into a branch pipe, the weakest area of such a connection is the point where the angularity changes and the area of pipe immediately adjacent extends throughout the curved or angular transition section of the fitting and the area of its welded connection with the conduit. It is therefore an important object of the present invention to provide a welded outlet fitting which is so constructed as to reduce the potential areas of stress concentration by avoiding abrupt directional changes in shape and in wall-thickness. More particularly, this object is accomplished (1) by providing the fitting with a flared throat section adapted to be inset within an opening in the wall of a conduit and butt-welded thereto so as to avoid abruptly increasing the wall thickness of the conduit surrounding the opening at the point where the fitting joins the conduit and to avoid abrupt change in angularity at that point, (2) by making the throat section of uniformly changing curvature throughout its transition section leading off from the conduit to avoid an abrupt change in angularity in the fitting and attendant stress concentrations and (3) by thickening the point of directional change from conduit to branch to distribute the stresses over a wider area but by gradually and progressively increasing the wall thickness of the fitting throughout its transition section whereby to avoid abruptly increasing wall thickness and creating new stress concentrations.

Another object of the invention is to provide a welded outlet fitting of the above character having a wall thickness which, regarded in longitudinal cross-section, gradually and progressively increases from opposite ends of the transition section of the fitting, the surfaces forming the inner and outer circumferences of the fitting being defined by non-concentric arcs of different curvature and the arc of curvature of the outer circumference being of a longer radius than the arc of curvature of the inner circumference.

A further object of the invention is to provide a fitting of the above character in which the ends of the fitting are disposed in sufficiently distantly spaced relation from the region of maximum thickness and directional change of the fitting to avoid weakening the joint by introducing additional stresses into the fitting in the vicinity of stress concentration by reason of the adverse metallurgical and notch effects inherently resulting from welding the fitting to the conduit and to the branch pipe.

Still another object of the invention is to provide an outlet fitting of the above character having tongues extending beyond the periphery of the throat section and engaging the circumference of the conduit to support the fitting in welding position within an opening in the conduit, the tongues being bendable to afford means for compensating for irregularities in the marginal portion of the wall of the conduit surrounding the opening, whereby the fitting may be properly seated in the opening preparatory to and during welding.

Other objects and advantages will be apparent from the following detailed description of a preferred embodiment of the invention considered in connection with the accompanying drawing, in which:

Figure 1 is a cross-sectional view of a welded outlet fitting shown welded to a conduit, a portion of the conduit being shown in longitudinal cross-section;

Figure 2 is a cross-sectional view of the outlet fitting shown in Figure 1 but viewed at right-angles thereto;

Figure 3 is a view in side elevation of the outlet fitting corresponding to the view of Figure 2; and Figure 4 is a plan view of the outlet fitting.

In the drawing is illustrated a tubular, metallic, outlet fitting F, this fitting being shown in Figs. 1 and 2 in the position it occupies when welded to a metal conduit P, as indicated in fragmentary cross-section. The bore of the fitting is provided with a flared inlet end or throat 1 and a generally cylindrical outlet end 2. The outlet end of the fitting is adapted to be connected to a branch pipe (indicated in broken lines in Fig. 1) for leading fluid off from the conduit. The fitting is adapted to be inset and to closely interfit within an opening 3 formed in the wall of the conduit with the longitudinal axis of the bore extending angularly, and here shown as perpendicular, to the center line of the conduit. The perimeteral edge of the flared end of the fitting is contoured to the curvature of the conduit, and the edges of the opening and that of the flared end of the fitting are suitably chamfered to form a V-shaped groove 4 between the adjacent edges so that the fitting may be bonded to the conduit by depositing weld metal W so as to completely penetrate between the edges of the opening and the fitting.

For supporting the fitting in position preparatory to and during welding, the flared end of the fitting is provided with a series of flat tongues 5 of bendable metal secured to the fitting and projecting outwardly beyond the perimeteral edge of the fitting so as to rest upon the circumference of the pipe. After the fitting has been tack welded in place the tongues may be removed with a chisel or other suitable tool.

An important feature of the fitting is the longitudinal cross-sectional shape of the wall of the fitting, which, of course, will also determine its transverse cross-sectional wall thickness. This wall, as illustrated in Figs. 1 and 2, is composed of the area included between elements of revolution constituting the inner and outer circumferences of the fitting. These elements throughout the transition zone defined by the flared end of the fitting are described by arcs having different radii generated from the centers C and C'. The center of curvature of the arc of shorter radius defining the inner circumference is indicated at C, while the center of curvature of the arc of longer radius defining the outer circumference is indicated at C'. The center C is located at a slightly lower elevation, measured vertically, than the center C', as indicated in Fig. 2. By virtue of this construction, the wall is of gradually and uniformly increasing thickness from opposite ends of the fitting and its maximum thickness occurs throughout the transition zone, or throat of the fitting.

By virtue of this construction, the section determining the directional change of the fitting, which is the portion of the fitting defined by the arc C, is gradually and uniformly increased in thickness in direction extending inwardly from the opposite ends of the fitting. By thus avoiding abrupt changes in direction and wall thickness and by gradually increasing the thickness of the wall portion lying adjacent the zone of directional change of the fitting, maximum strength is imparted to the fitting throughout its section heretofore most susceptible to failure.

The flared end of the fitting is shaped so as to merge into the cylindrical circumference of the conduit P, the thickness of the flared end of the fitting adjacent its chamfered terminal end, or welding, face corresponding as nearly as possible with the wall thickness of the conduit so that when the fitting is welded in place, as illustrated in Figs. 1 and 2, the inner surfaces of the fitting and conduit lie flush. Likewise the wall thickness at the outlet end of the fitting adjacent its chamfered terminal end, or welding, face corresponds substantially to the wall thickness of the branch pipe. This condition can be attained preliminary to the welding operation by inserting the fitting into the opening in the conduit supported by the bendable tongues 5 and tapping the flat tongues with a hammer until the fitting is properly seated, ready for welding.

It will be apparent from the drawings that the flared end of the fitting is expanded to such an extent that its chamfered perimeteral edge is distantly removed from the curved and thickened transition section of the fitting in order to prevent stresses, that inherently accompanying the welding operation, from being superimposed into the section of the fitting of maximum stress concentration due to internal pressure and/or mechanical forces. Similarly, the outlet end of the cylindrical portion of the fitting is spaced sufficiently far from the region of greatest directional change and wall thickness of the fitting to avoid the introduction of stresses into that region due to the welding of the branch pipe to the fitting.

The fitting may be formed of steel or other similarly fusible metal. Also the term "welded" is used in a broad sense to include brazed or other forms of union by metal fusion. Also the outlet end of the fitting, if desired, may be extended a greater length than that illustrated in the drawing so long as the fitting includes the particular features of construction of the transition section described above. The branch pipe is connected to the outer end of the fitting by butt welding, or it may be connected thereto in any other conventional manner.

It will be apparent from the foregoing description that there is provided an angled welded outlet fitting which forms a junction between conduit and branch pipe by a smooth, gradual integration of one with the other which reduces potential points of stress concentration. This construction increases the structural strength of the fitting by increasing its thickness at the points of greatest stress concentration while at the same time it avoids abrupt changes in direction and wall thickness such as would otherwise create anew areas of stress concentration and therefore weakness. Finally this construction provides a smooth transition in wall thickness to a degree such that the stresses throughout the branch connection area tend to equalize, and thereby provide optimum strength, rather than to merely shift the stresses from one area to another.

Manifestly various other changes in construction and design may be made in the fitting described above without departing from the spirit of the invention as set forth in the following claims.

I claim:

1. An integral one-piece outlet fitting composed of fusible metal adapted to provide an angled branch connection between a tubular offtake branch and a metallic conduit or other cylindrical hollow body of larger diameter than the tubular offtake branch adapted to confine fluid under high pressure and particularly where operating stresses approach the yield strength of the conduit material, said fitting being so constructed and arranged to avoid localized stress concentrations resulting from abrupt changes in angularity and in wall thickness so as to afford maximum strength with an economy of metal, said fitting having an outlet end section of substantially cylindrical form and an inlet end section in the form of a flared throat section, the perimeteral edge of the throat section being of a shape to define the circumference of the cylindrical conduit which latter conduit has its longitudinal axis disposed at an angle to the longitudinal axis of the cylindrical outlet end section, whereby the throat section may be inserted within and butt-welded to the edges of a pre-formed opening in the wall of the conduit, that portion of the fitting extending from the outlet end section to adjacent the perimeteral edge of the flared throat section defining a transition section wherein a plane lying normal to the longitudinal axis of said outlet section will intersect the wall of the transition section to define a transverse wall cross-section having its inner circumference concentric with its outer circumference, the longitudinal cross-sectional area of the wall of the transition section being defined by arcs of different radii and curvature, the arc of curvature of the outer circumferential surface being of greater radius than the arc of curvature of the inner circumferential surface, and the center of curvature of the inner circumferential surface being disposed at an elevation below the center of curvature of the outer circumferential surface and located closer to the longitudinal axis of the cylindrical outlet section, and the arcs of curvature developed from said centers and describing the longitudinal cross-sectional area of the wall resulting in a wall thickness at the outlet end of the fitting adjacent its terminal end face corresponding substantially to the wall thickness of the connecting tubular offtake branch and a wall thickness at the perimeteral edge of the flared inlet section adjacent its terminal end face corresponding substantially to the wall thickness of the conduit, the wall thickness at the perimeteral edge of the flared inlet section being different from the wall thickness of the outlet section, whereby to define a wall of gradually and progressively increasing thickness inwardly from each of the opposite ends of the transition section and having its maximum thickness intermediate said opposite ends and substantially removed from the perimeteral welding edge of the flared throat section.

2. A fitting as set forth in claim 1 including a series of flat, laterally spaced-apart tongues secured to the outer surface of the flared throat section and projecting outwardly beyond the perimeteral edge of the throat section to engage the edge of the opening in the conduit for supporting the fitting within the opening preliminary to welding, said tongues projecting beyond the perimeteral edge of the throat section and being so dimensioned as to be bendable to enable the adjustment of the fitting within the conduit opening to compensate for variations in conduit roundness, thickness and opening size.

References Cited in the file of this patent

UNITED STATES PATENTS

| | | |
|---|---|---|
| 982,463 | Bennett | Jan. 24, 1911 |
| 1,889,874 | Obert | Dec. 6, 1932 |
| 1,960,557 | Snyder | May 29, 1934 |
| 2,421,596 | Bruce | June 3, 1947 |
| 2,463,006 | Clute | Mar. 1, 1949 |
| 2,480,858 | Hobbs | Sept. 6, 1949 |
| 2,670,224 | Markl | Feb. 23, 1954 |

FOREIGN PATENTS

| | | |
|---|---|---|
| 329,214 | Italy | Sept. 3, 1935 |